(12) United States Patent
Weir et al.

(10) Patent No.: US 11,519,698 B1
(45) Date of Patent: Dec. 6, 2022

(54) SOFT ANTI-BALLISTIC COMPOSITE

(71) Applicant: Government of the United States as represented by the Secretary of the Air Force, Wright-Patterson AFB, OH (US)

(72) Inventors: Hayley M Weir, Seneca, SC (US); Ryan P Burke, Monument, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 827 days.

(21) Appl. No.: 15/933,540

(22) Filed: Mar. 23, 2018

Related U.S. Application Data

(60) Provisional application No. 62/477,355, filed on Mar. 27, 2017.

(51) Int. Cl.
| | |
|---|---|
| *F41H 5/04* | (2006.01) |
| *B32B 5/02* | (2006.01) |
| *B32B 5/26* | (2006.01) |

(52) U.S. Cl.
CPC .......... *F41H 5/0485* (2013.01); *B32B 5/024* (2013.01); *B32B 5/26* (2013.01); *B32B 2250/20* (2013.01); *B32B 2255/02* (2013.01); *B32B 2262/02* (2013.01); *B32B 2262/0253* (2013.01); *B32B 2262/101* (2013.01); *B32B 2262/106* (2013.01); *B32B 2571/02* (2013.01)

(58) Field of Classification Search
CPC . F41H 5/0485; F41H 5/06; F41H 5/04; F41H 5/007; F41H 5/26; B32B 2250/20; B32B 2262/02; B32B 2262/101; B32B 2262/106
See application file for complete search history.

(56) References Cited

U.S. PATENT DOCUMENTS

| | | | |
|---|---|---|---|
| 6,699,573 B1 * | 3/2004 | Katzer | B32B 27/32 428/221 |
| 7,226,878 B2 | 6/2007 | Wagner et al. | |

(Continued)

FOREIGN PATENT DOCUMENTS

| | | | | |
|---|---|---|---|---|
| CA | 2789604 A1 * | 3/2013 | | D01D 5/36 |
| KR | 20160060664 A * | 5/2016 | | B32B 5/245 |

(Continued)

OTHER PUBLICATIONS

Kim, The Ballistic Impact Characteristics of Woven Fabrics Impregnated with a Colloidal Suspension and Flattened Rolls, Advances in Science and Technology, 2010.
(Continued)

*Primary Examiner* — Benjamin P Lee
(74) *Attorney, Agent, or Firm* — AFMCLO/JAZ; Timothy M. Barlow

(57) ABSTRACT

A composite material for dissipating the kinetic energy of an impacting object includes a strike face oriented to receive the impacting object and a protected face oriented to be proximate a user or a protected item. A first portion includes at least a first woven fabric layer and at least a Non-Newtonian Fluid (NNF) sheet. The first portion is disposed adjacent the strike face. A second portion includes at least a second woven fiber layer, and the second portion is disposed adjacent the protected face.

4 Claims, 1 Drawing Sheet

(56) References Cited

U.S. PATENT DOCUMENTS

| | | | |
|---|---|---|---|
| 7,498,276 | B2 | 3/2009 | Wagner et al. |
| 9,121,674 | B2 * | 9/2015 | Wilson .................. F41H 5/04 |
| 9,238,332 | B2 * | 1/2016 | Dunleavy ............ F41H 5/0485 |
| 9,464,872 | B2 * | 10/2016 | Dyke .................... F41H 5/0421 |
| 9,816,788 | B2 | 11/2017 | Haq et al. |
| 2007/0178374 | A1 * | 8/2007 | Aizenberg ............. B32B 27/08 |
| | | | 429/144 |
| 2009/0004413 | A1 * | 1/2009 | Wagner .................... F16F 9/30 |
| | | | 428/34.1 |
| 2012/0174759 | A1 * | 7/2012 | Gallo .................... F41A 17/06 |
| | | | 89/36.02 |
| 2012/0186430 | A1 * | 7/2012 | St. Claire ............ F41H 5/0485 |
| | | | 89/36.02 |
| 2014/0311327 | A1 * | 10/2014 | Dunleavy ............ B29C 70/021 |
| | | | 89/36.02 |
| 2014/0311329 | A1 * | 10/2014 | Dyke .................... F41H 5/0428 |
| | | | 89/36.02 |
| 2015/0082976 | A1 * | 3/2015 | Meldner .................. F41H 1/02 |
| | | | 89/36.02 |
| 2015/0267005 | A1 * | 9/2015 | Bunger ................. C09J 183/14 |
| | | | 428/34.1 |
| 2015/0268010 | A1 * | 9/2015 | Strauss .................. B32B 27/32 |
| | | | 89/36.02 |
| 2016/0213078 | A1 * | 7/2016 | Bibeau .................... B32B 27/40 |
| 2016/0221303 | A1 * | 8/2016 | Jancar .................... B32B 5/245 |
| 2016/0289467 | A1 * | 10/2016 | Yoo ...................... D06M 13/165 |
| 2017/0153089 | A1 * | 6/2017 | Bahu ...................... B32B 27/065 |
| 2017/0314894 | A1 * | 11/2017 | Tunis, III .................. B32B 5/12 |
| 2018/0310698 | A1 * | 11/2018 | Rao .................. G08B 13/19695 |
| 2019/0292101 | A1 * | 9/2019 | Ihsan .................... C04B 14/042 |

FOREIGN PATENT DOCUMENTS

| | | | | |
|---|---|---|---|---|
| WO | WO-2004074761 | A1 * | 9/2004 | ........... F41H 5/0485 |
| WO | WO-2010123593 | A2 * | 10/2010 | ............. B32B 9/005 |
| WO | WO-2020018539 | A1 * | 1/2020 | ............... B32B 5/08 |

OTHER PUBLICATIONS

Park, Ballistic performance of p-aramid fabrics impregnated with shear thickening fluid; Pad I—Effect of laminating sequence, Textile Research Journal, 2012.
Egres, Stab Resistance of Shear Thickening Fluid (STF)—Kevlar® Composites for Body Armor Applications, Proceedings for the Army Science Conference, 2005.
Patel, Autonomic Healing of Low-Velocity Impact Damage in Fiber-Reinforced Composites, Composites: Pad A, 2009.
Srivastava, Improving the Impact Resistance Performance of Kevlar® Fabrics Using Silica Based Shear Thickening Fluid, Materials Science and Engineering, 2011.
Li, Preparation of Body Armour Material of Kevlar® Fabric Treated with Colloidal Silica Nanocomposite, Plastics, Rubber and Composites, 2008.
Wetzel, Novel Flexible Body Armor Utilizing Shear Thickening Fluid (STF) Composites, 14th International Conference on Composite Materials, 2003.
Kalman, Polymer Dispersion Based Shear Thickening Fluid-Fabrics for Protective Applications, Proceedings of SAMPE, 2007.
Gustin, Low Velocity Impact of Combination Kevlar®/Carbon Fiber Sandwich Composites, Department of Mechanical Engineering and Applied Mechanics at North Dakota State University, 2005.
Lee, The ballistic impact characteristics of Kevlar® woven fabrics impregnated with a colloidal shear thickening fluid, Journal of Materials Science, 2003.
Bazilevsky, Sedimentation of Particles in Shear Flows of Viscoelastic Fluids with Fibers, 2017.
Grujicic, Application of the Materials-by-Design Approach to Armor-Grade Polymer-Matrix Composites for Enhancement of Ballistic-Penetration Resistance, 2015.
Strawhecker, Morphological and Local Mechanical Surface Characterization of Ballistic Fibers via AFM, 2014.
Cunniff, A Method to Describe the Statistical Aspects of Armor Penetration, Human Vulnerability, and Lethality Due to Fragmenting Munitions, 2014.

* cited by examiner

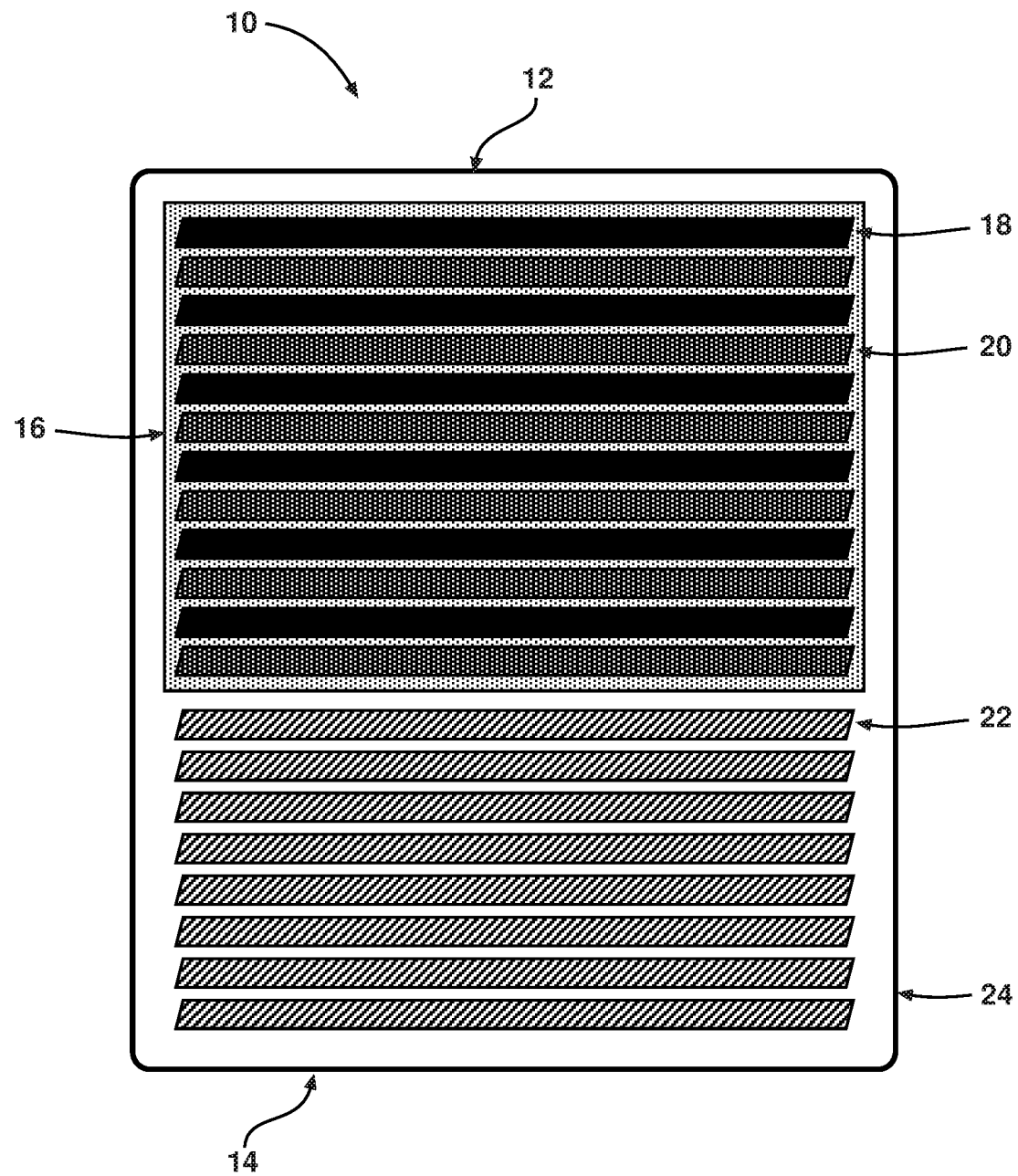

US 11,519,698 B1

SOFT ANTI-BALLISTIC COMPOSITE

Pursuant to 37 C.F.R. § 1.78(a)(4), this application claims the benefit of and priority to prior filed Provisional Application Ser. No. 62/477,355, filed 27 Mar. 2017, which is expressly incorporated herein by reference.

RIGHTS OF THE GOVERNMENT

The invention described herein may be manufactured and used by or for the Government of the U.S. for all governmental purposes without the payment of any royalty.

FIELD OF THE INVENTION

The present invention relates generally to personal protective equipment and, more particularly, to high-velocity projectile-resistant composites.

BACKGROUND OF THE INVENTION

There has always been an interplay between weapons and armor (or other defensive capabilities). With each age of improved weaponry, the armory and countermeasures evolved accordingly. Long before the emergence of edged weapons, let alone propellant-driven projectiles, animal hides were employed to mitigate the impact of blunt instruments. Ancient warriors cloaked themselves in rhinoceros skin or the like, while others wielded shields of bronze or wood. In medieval Europe, knights were fortunate enough to be outfitted with ornate chainmail comprised of thousands of tiny steel links. With the advent of high-velocity crossbow and longbow, heavy steel-plate armor was one of the only effective defenses thereof. The introduction of truly high velocity projectiles, on the on the order of 1,000 to 4,000 feet per second (as compared to a high-velocity crossbow bolt at approximately 400 feet per second), necessitated a major change in armor design.

Most of today's soft armor used in military and police applications combines several layers of Kevlar® or aramid fiber to form a thick, somewhat inflexible outer layer capable of stopping a particular class of projectile threat. By way of example, in order to meet National Institute of Justice (NIJ) II-A certification standards, soft body armor suitable for both military and law enforcement purposes must be capable of containing a quantity of five 9 mm projectiles fired from close range (approximately 5 m). Stopping a 9 mm projectile traveling 900-1100 ft/second requires significant energy dispersion capabilities. For current soft armor designs, this energy dispersing capability necessitates a thick, multi-layered sequence of dozens of Kevlar® sheets encased in a heavy canvas exterior shell. Due to its thickness and multi-layered design, current soft armor options for military and law enforcement lack a degree of flexibility and cannot be molded to shapes for alternative uses.

In an effort to lighten armor loads while maintaining ballistics performance consistent with currently fielded products, armor developers and researchers continually seek alternative materials for use in future protective equipment. However, today's armor still lacks the lightweight, flexible, and malleable characteristics desired while still offering sufficient ballistics protection against projectiles fired from small caliber ammunition, as well as affording protection from shrapnel.

As a result, there is an unmet need in the art for soft armor applications having equal or greater ballistic performance for a given thickness of material, while enabling enhanced flexibility and conformance to undulated structures.

SUMMARY OF THE INVENTION

The present invention overcomes the foregoing problems and other shortcomings, drawbacks, and challenges of employing armor having sufficient ballistic performance characteristics while donning unacceptably thick, massive, or inflexible structures. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a composite material for dissipating the kinetic energy of an impacting object is provided. The composite material includes a strike face oriented to receive the impacting object and a protected face oriented to be proximate a user or a protected item. A first portion includes at least a first woven fabric layer and at least a Non-Newtonian Fluid (NNF) sheet. The first portion is disposed adjacent the strike face. A second portion includes at least a second woven fiber layer, and the second portion is disposed adjacent the protected face.

According to an additional embodiment of the disclose invention, a composite material for dissipating the kinetic energy of an impacting object is provided The composite material includes a strike face oriented to receive the impacting object and a protected face oriented to be proximate a user or a protected item. A first portion includes at least six alternating layers of carbon fiber and at least five layers of Non-Newtonian Fluid (NNF) sheets The NNF sheets are dispensed as a mixture of polyethylene glycol 400 and about 7% $SiO_2$ by weight, wherein the dispense thickness is about 220 ml/m$^2$. The first portion is enclosed in an air impermeable envelope and is disposed adjacent the strike face. A second portion includes at least eight aramid fiber woven layers, and the second portion is disposed adjacent the protected face.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 depicts a schematic assembly diagram, in accordance with embodiments of the disclosed invention, wherein an assembly of aramid layers, carbon fiber layers, and Carbon Fibers are provided in a particular configuration. Other configurations will be disclosed via textual description, tabular data, and the like, but FIG. 1 shall serve an instructive foundation for disclosed variants thereof.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the disclosed invention combine specific variations of non-Newtonian Fluids (NNFs), carbon fibers (CF), woven fiberglass (WFG), Kevlar®, other fibers that will be explored below, and combinations thereof, into a unique layering and packaging scheme that contains (stops) 9 mm, .40 caliber, and .44 magnum projectiles fired from close range, or approximately 5 m (16.4').

The disclosed composite yields a lightweight, malleable, and ballistically-sound soft armor variant that represents a major improvement in current soft armor technology. Its applications range from military and law enforcement to other commercial industries including aviation, home protection, and sports equipment. The novel and improved composite structures provide an advancement in both application and performance with respect to numerous fields.

In the discussion that follows, reference will be made to certain trade names whenever such trade named products were used in experiments or simulations. Whenever possible, generic equivalents are disclosed in parallel to the trade-named products, and the performance thereof is expected to be similar. Additionally, the term "non-Newtonian fluid" shall be defined as any fluid that does not obey Newton's Law of Viscosity.

FIG. 1 may serve as a template for various combinations and embodiments of the disclosed invention. A ballistic composite 10 includes a strike face 12 disposed at a first end, and a protected face 14 disposed at a second end. The strike face 12 is configured to receive a ballistic projectile, and the protected face 14 is configured to face the body of a user (usually with an intermediate, non-protective, garment disposed between the user and the protected face).

A first container 16 includes one or more layers of a first woven fiber layer 18 and an NNF sheet 20. The first woven first woven fiber layer 18 and NNF sheet 20 may be selected from the list of materials that will be disclosed in detail below. Likewise, the number of layers, the layering scheme, and relative geometries of each layer may be adjusted in accordance with the disclosed embodiments of the invention. In some embodiments, the first container 16 may include a plastic bag wherein substantially all of the air has been evacuated therefrom. Vacuum levels attainable by residential vacuum-sealing equipment has been shown to produce acceptable results. Evacuating until no visible air bubbles are contained with the first container 16 has been shown to produce acceptable results.

A plurality of second woven fiber layers 22 may be disposed external to the first container 16 but internal to a second container 24. The second container 24 may also be a sealed plastic bag. Some embodiments may be evacuated of substantially all air, while other embodiments may provide acceptable results while sealed at ambient air pressure. The composition of matter of the second woven fiber layer 22, number of layers, as well as the thicknesses thereof, may be varied in accordance with embodiments of the disclosed invention.

The ballistic composite 10 may then be positioned in a vest or other carrier suitable to position the ballistic composite 10 in a protective orientation. Some embodiments of the disclosed invention will include a plurality of first containers 16 or second containers 24 disposed in the vest or carrier. In so doing, multiple projectile impact survivability may be improved, as the NNF sheet 20 in one region of the vest may be retained independent of the rupturing of containers 16 or 24 in other regions of the vest.

A brief summary of the discovered and exploited operating principles will be provided herein. Then, general design considerations and specific exemplary embodiments will be disclosed thereafter.

The NNFs used in armor applications are often comprised of two components: a particle and a fluid. The disclosed invention uses readily available polymer solutions such as polyethylene glycol (PEG), though additional exploration has been made into various fluids and their effect on the rheological behavior of these NNFs. The second component of the NNF is the particles which may be suspended uniformly within the fluid at various percentages. These particles can be ceramic-based (hard) particles, or polymeric (soft) particles. Each type of particle has its strengths and weaknesses and each significantly affects the behavior of the fluid at high shear rates (as would be experienced if armor acts to stop a projectile such as a bullet or a piece of shrapnel). Polymer fibers such as Kevlar or Spectra may be used in tandem with the disclosed NNFs in order to enhance the ballistics performance and to provide structure and a surface for particles within the NNF to interact with when non-Newtonian behavior occurs. The disclosed combination of fluid, particles, and fiber combine to provide a number of benefits, including flexibility due to the use of malleable materials. Cost is also reduced significantly due to the availability of inexpensive materials that comprise embodiments of the disclosed invention. The elegance of the design also removes the need for advanced processing as would occur with traditional ceramic armor. The disclosed invention also overcomes the relative ambiguity provided in known prior art. Whereas known prior art fails to specify exact specifications of many such designs and instead describes concepts in vague generalities (i.e. NNFs combined with aramid fibers can improve ballistics performance), the disclosed invention offers myriad specifications of the composite material that known prior art does not. Some specifications offered herein—that known prior art fails to identify—include: exact number and sequence of fabric layers within the composite structure; layering patterns and specific packaging schemes of multiple fibers to form a single composite structure; specific molecular weight and ranges of the fluids; specific particle size range for successful NNF composition; optimum volume amounts for NNF spreading over chosen fabrics of a particular dimension; specific shear rate of NNFs undergoing successful testing; and specific types of ammunition/projectiles successfully contained by the disclosed invention. Each of these specifications pertains to a particular dimension of the composite sample used during testing. With the level of specificity offered in the disclosed invention for a particular dimension, one skilled in the art can extrapolate this information to determine relative values for larger production requirements while ensuring equal anti-ballistics performance despite an increased production scale as compared to the tested samples.

When analyzing embodiments of the disclosed invention, it would seem fantastical that something so thin could have any respectable anti-ballistics behavior. However, projectiles up to a .44 magnum have been successfully stopped with just over a dozen layers of fabric in conjunction with the disclosed NNF. The successes for these embodiments can be attributed to non-Newtonian behavior of colloidal suspensions. More specifically, it is a combination of shear thinning and shear thickening behavior observed in these particular suspensions that are exploited for anti-ballistics applications. Initially it was believed that only discontinuous shear thickening (DST) occurred within these fluids and that the thickening behavior resulted in improved anti-ballistics behavior when used in tandem with fiber. However, this is not always the case. Using a Quartz Microbalance with dissipation monitoring (QCM-D), it was observed in the disclosed embodiments that upon projectile impact with the strike face, rather than single step shear thickening behavior, the non-Newtonian behavior occurs in two different stages: it thins and thickens. While DST does play a role in the function of the design, it is not the only behavior attributed to the NNF offering additional anti-ballistics capacity. A pronounced thinning effect has been observed to contribute to the invention's superior performance relative to known prior art.

For context, DST is a phenomenon in dense suspensions (larger volume fraction of particles to solution; packing fractions ($\Phi$)=0.45+) where friction, surface interaction, particle interaction and other molecular forces combine to produce a significant jump in viscosity under certain shear rates, generally large ones. Compared to less dense STFs or ones that don't have significant inter-fluid interactions, the result is vastly different. In order for DST to occur, the fluid needs to be comprised of hard particles within the polymeric solution, densely packed ($\varphi$=0.56-0.60 or even greater) and in conjunction with fibers that provide a sufficient frictional surface. Under these conditions, the solution will undergo a jamming type behavior when a critical shear rate is reached and the viscosity will jump significantly.

By way of example, a significant jump in viscosity may be observed once the critical shear rate is achieved, especially when observing a packing fraction of, say, 0.58, though the material fails much sooner than at lower fractions down to $\varphi$=0.50. Performance significantly drops when the fraction is reduced, and at $\varphi$=0.50, there may be a disappearance of that jamming behavior and the fluid will not thicken. In some cases, it will shear thin, which was previously thought to be unacceptable for ballistics applications. Known prior art suggest that higher ballistic resistance is achieved with composites using densely packed STFs. However, Applicant's new observations from developing, testing, and evaluating the disclosed invention reveals something new: shear thinning can—and does—improve anti-ballistic composite behavior through a multi-modal process described in detail below.

Known prior art has been limited to the use of rheometers to assess the rheology and general suitability of NNFs for use in armor applications, among other things. With the need for DST behavior in mind, rheology becomes the primary focus in known prior art when optimizing polymer STF-based armors. As previously discussed, an STF is comprised of two components: fluid and particles. When selecting a fluid, one must evaluate if polarity is a factor in the performance of the selected fluid. Polypropylene glycol (PPG) and similar polar compositions, at dense packing fractions as described above, demonstrate increased DST behavior as the concentration of PPG increased. It is believed that hydrogen bonding influences the DST behavior. Conversely, much less-polar solutions of similar compositions, such as hydrocarbon-capped polyethylene glycol (PEG) showed mild shear thickening and even shear thinning behavior at high shear rates, the opposite of what is necessary for armor applications. However, the results showed that much of this behavior can be attributed to polymer concentration. Polar polymer solutions seem to produce better DST behavior in suspensions. There is an increase in both elastic (storage) and viscous (loss) moduli of the polar suspension with little change in the nonpolar suspension when frequency is increased (and thus related to viscosity). It has been shown that increasing both the concentration and the chain length of the polymer in solution greatly affects the DST behavior. As both chain length and concentration increase, so too does the DST behavior.

In order to induce DST behavior, acceptable results have been achieved by utilizing a polar polymer solution of relatively high molecular weight (about 4,000 g/mol or higher) in conjunction with particles. This will induce DST with the jamming behavior favorable for armor applications.

With the fluid parameters defined to induce DST, the particle must be selected to maximize ballistic performance. As previously stated, these particles can be classified into either hard or soft spheres, and can come in a variety of sizes, shapes, and with different surface charges. For the sake of simplicity, only spherical particles will be discussed. With respect to the physical composition of matter used for the particle, studies have shown that hard silica particles typically used in colloidal suspensions cause noticeable pitting and fraying of fiber filaments when placed under a 150N stabbing force. However, the hard particles performed much better in ballistics tests when compared to soft particle polymethyl methacrylate (PMMA) suspensions at packing fractions varying from $\varphi$=0.40-0.49, with $V_{50}$ for hard particle samples at roughly 250 m/s, double that of soft particles. The PMMA particles demonstrated warping after load which decreased the thickening behavior when loads were reapplied (reversible shear thickening). This suggests that particle hardness may play a significant role in DST behavior. Specifically, to exhibit repeatable performance (and perhaps to aid in multiple projectile strike survivability) the particles should not deform under load. With deformation, thickening behavior is not repeatable and thus not favorable for armor applications.

In tandem with particle hardness, particle size may also affect the quality of DST behavior. Generally, the larger the particle size, the greater the thickening behavior in STFs. While this loose design rule is useful for material selection, it should be noted that surface charges affected the DST behavior more than particle size. The more short-range interactions that exist between the particles, the greater the jamming effect of particles in the DST behavior. By way of example, when these forces are mitigated through the use of nitric acid in solution to strip particles of their electrostatic attraction, more particle slipping occurred and thus DST behavior was almost non-existent. In summation, to create significant DST jamming behavior in an STF, the most success was found when the particles were hard (not polymeric), comparatively large (upwards of 1000 μm) and when the particles were allowed to interact significantly with one another at the local scale. Embodiments of the disclosed invention maximize strong interaction between particles, solution, and fibers, thus improving the success of these STF-polymer composite embodiments.

A third consideration in STF armor is the anti-ballistic fibers used within the samples. Though still significant for armor, experiments suggest that the fibers play a supportive role rather than a main role in ballistics applications when used in conjunction with STFs. First, it is important to know which fabric to utilize. Generally speaking, there are two types of ballistic resistant fabrics on the commercial market today: aramid fibers and ultra-high molecular weight polyethylene (UHMWPE). UHMWPE shows great promise as an option; when processed correctly the plastic shows four times greater ballistics resistance than standard PE. However, this comes at a loss of flexibility due to higher crystallization. Aramid fibers like Kevlar performed similarly to UHMWPE, though its mode of failure differed from UHMWPE. Kevlar tends to fail through fiber pulling as opposed to bond breaking. When fibers were used in combination with STFs (aramid fibers on the impact side of the composites) known prior art samples failed to perform as well as plain Kevlar. Looking at the fluid interactions, a key factor in DST behavior was the inter-fluid and inter-particle interactions. Therefore, it is believed that fibers that encourage friction and interaction with the STF may provide greater benefit to STF armor samples.

To summarize, to create an operable STF armor combination, specific criteria must be met in the samples, both with the fluid-particle suspension and the fabric. First, the polymer solution used for the suspension should be polar with a larger molecular weight. The particles should be hard (ceramic-based), larger (1000 μm+) particles with the ability to interact with themselves and the solution at the local scale. The fibers used in conjunction with the STF should provide a medium to encourage these frictional behaviors between the particles in the fluid. These factors in combination should produce a significant jamming effect through DST behavior under high shear rates expected in ballistics resistant armor samples.

Testing and evaluation of the inventive embodiments may be accomplished several ways. High-speed imaging with a camera while the sample undergoes ballistics testing is a great binary way to judge success. If a projectile (bullet, metal sphere, or another particle) is fired at the sample, one can ascertain the percentage of the composite's thickness required to capture the projectile. If the sample performs well under these practical considerations, measuring rheology of the fluid may be a useful next step, since the STF is the backbone of these polymer-based flexible armors.

With rheology measurements, one may ascertain the critical shear rate and determine if DST is occurring for a certain applied energy. For all STFs, the critical shear rate is vitally important, because if DST is not achieved and the jamming effect does not occur, the STF will rapidly lose viscosity in a shear thinning behavior as the shear rate progresses beyond the critical point[1]. Until now, it was thought that shear thinning would be detrimental to armor performance in NNF-based composite applications. Since projectiles tend to travel at very high velocities and impart significant shear stresses to armor samples, the concept of shear thinning seems antithetical and unable to contribute to anti-ballistics capacity. Therefore, known prior art emphasizes DST and attempts to determine its most critical point to inform armor development. Testing the rheology of the fluids can help determine where DST occurs and where it doesn't. However, standard rheometers fail to impart sufficient shear force to accurately represent the true force of a projectile impact on a target. Due to rheometer limitations, one must then provide data to extrapolate out to very high shear rates observed in field conditions. Extrapolated data is—at best—predictive and limited. Known prior art emphasizes rheology and extrapolates; the disclosed invention was evaluated using a quartz microbalance with dissipation monitoring (QCM-D) to provide a more accurate, less limited representation of likely anti-ballistics capacity and performance against high-velocity projectiles.

Using a Quartz Microbalance with dissipation monitoring (QCM-D), it was observed that upon projectile impact with the strike face, rather than the single step shear thickening behavior as described above, the non-Newtonian behavior occurs in two different stages: it thins and thickens. The QCM-D is a thin quartz crystal attached to electrodes which can be vibrated at very high frequency. This frequency of vibration is directly related to shear rate, which is directly related to shear force. Thus, one can vibrate this crystal at up to 25 MHz (in shear) to closely replicate the shear force imparted on a ballistic sample when shot by a high velocity projectile. Standard rheometers fail to do this. Given this limitation, other research efforts could only extrapolate rheology data. Using the QCM-D one can accurately measure effects of a fluid up to $25 \times 10^6$ s$^{-1}$. A standard rheometer can only measure up to $10^3$ to $10^4$ s$^{-1}$. Because of this, researchers could only predict what happened with the fluid at shear rates on the order of $10^6$. The QCM-D allows one to assess behavior at greater shear rates than permitted by a rheometer; hence there is no extrapolation involved. The suspensions generally used by researchers for anti-ballistics purposes exhibit shear thickening behavior at low to medium shear rates.

These fluids will continue to thicken until they reach a critical shear rate which depends on the type of fluid and particles used in the suspension, typically on the order of $10^4$ to $10^5$ reciprocal seconds. After this critical shear rate is reached, a standard thickening suspension will not thicken any longer; in fact, the fluid may thin down to a smaller viscosity, and applying more force will not change this behavior. Under the impact of a bullet, the strike face of the armor may experience shear rates up to the order of $10^6$ s$^{-1}$. This is beyond the critical shear rate. Despite exceeding the critical shear rate, the disclosed invention still experiences remarkable anti-ballistics behavior.

The difference is that the disclosed embodiment undergoes a "bi-modal shear thinning-thickening" (BM-ST2) behavior. Instead of the applied NNFs undergoing a thickening behavior that was believed to happen, there is a two-step process that the armor experiences which leads to its success. First, upon projectile impact, the force applied creates a shear rate beyond the critical point, and the fluid thins. This allows the fabric layers to orient themselves to the new force. Immediately post impact and after initial contact with the fluid-fiber strike face, the projectile rapidly slows and the shear rate drops. The projectile slows enough through this process to reach the critical shear rate. Once this happens, the fluid immediately thickens—as per the description of DST above—and ultimately the combination of fabrics and fluid stop the projectile.

In embodiments of the disclosed invention, the first portion (contained in the first container 16) of the composite may comprise alternating layers of non-Newtonian fluid layers and a first woven fiber layer 18. The non-Newtonian fluid may comprise a first liquid and a first particulate. Some embodiments of the non-Newtonian fluid may contain a second liquid that may serve as either a substitute for, or act in combination with, the first fluid. Likewise, a second particulate may serve as either a substitute for, or in combination with, the first particulate.

The second portion of the composite may include a plurality of second woven fiber layers, that may comprise aramid Kevlar® (poly paraphenylene terephthalamide), or the layers may be substituted with Spectrashield® (ultra-high-molecular-weight polyethylene), poly (p-phenylene-2,6-benzobisoxazole, aka (PBO), poly[2,2'-(m-phenylen)-5,5'-bisbenzimidazole (PBI), woven fiberglass, silk (natural or synthetic), or other high-strength-to-weight ratio filament known to one of ordinary skill in the art.

It is further noted that the non-Newtonian layers (NNF sheets 20) and the first woven fiber layers 18 may be stacked several thicknesses deep, and each of the stacked layers may comprise a different type of non-Newtonian fluid (NNF sheet 20), and each of the first woven fiber layers 18 may comprise a different type (composition of matter) of fiber. Likewise, the second woven fiber layers 22 may include a plurality of dissimilar fiber compositions layered or interwoven therein.

In the discussion of the embodiments that follows, it is relevant to note specific performance variations regarding the layer-number of projectile containment among the disclosed designs. For example, it is important to understand the general behaviors of NNFs, so that the performance of the disclosed composite can be evaluated. Generally speaking, greater shear force applied to a NNF—through a combination of both projectile velocity and surface area impact—will produce a greater deviation from standard Newtonian behavior. In other words, impacts that are more powerful will generate enhanced thickening or thinning effects in the fluid. In most encounters, the NNF should perform better against higher velocity projectiles with larger impact surface areas. The observed results seem to support this theory. During testing, each of the successful prototype designs resisted full penetration of the noted projectiles (i.e. the projectiles were contained in the armor packages and did not penetrate the ballistics gel placed as a backstop behind the armor composite). While all of the projectiles penetrated through the strike face 12 and first container 16 comprising CF (Carbon Fiber, first woven fiber 18) + NNF sheet 20 package in all tests, each was contained in the unsealed aramid layers disposed between the CF+NNF package and the ballistic gelatin. However, the larger, faster projectiles penetrated fewer layers of aramid fiber than the smaller, slower projectiles. This seemingly verifies that greater applied shear forces yield greater anti-ballistics effects. Table 1 outlines the performance of each package relative to the tested projectile:

TABLE 1

| Caliber | Kevlar ® Layer Stopped |
|---------|------------------------|
| 9 mm    | 4-5                    |
| .40 S&W | 2-3                    |
| .44 Mag | 1                      |

An exemplary fabrication method will be described herein, and the subsequent section will explore the components, configurations, and performance aspects of other embodiments. The exemplary fabrication description will be directed to the preferred embodiment (that is sufficient to contain a tested .44 magnum projectile fired from approximately 5 meters). Additional embodiments, along with qualitative and quantitative performance testing thereof, will be discussed in detail thereafter.

A colloidal NNF suspension is first mixed at a percent by weight between 7% and 30%. The NNF is then spread into a thin layer NNF sheet 20 at a rate of 220 ml/m$^2$ over 5×7" carbon fiber sheets (first woven fiber layer 18) (single sided application). The process is repeated x6 layers CF. The CF layers w/ NNF mixture are then stacked and layered to form a single 5×7" block (6 layers) which is then vacuum sealed in a clear food processor bag (first container 16) to prevent leakage and settling of the liquid. The sealed bag (w/ CF + NNF layers) is then placed into another food saver plastic bag (second container 24). 8 layers of 5×7" Kevlar® sheets (second woven fiber layer 22) are placed inside the same, unsealed bag, and directly behind the sealed CF+NNF package. This bag, containing both the sealed CF+NNF package and 8 layers of Kevlar® sheets is then sealed (not vacuum sealed) and weighed. The test prototypes measure ~5×7" (35 in$^2$). Again, the most successful embodiment (one that contained a .44 magnum from 5 m), weighed ~215 g and was ~.631 cm thick. Subsequent testing of this and other prototype designs noted in Table 2 below resulted in the successful containment of 9 mm, .40 S&W, and .44 magnum projectiles on center mass impact, fired from 5 m (16.4'), w/ <5 degree angle of incident.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

According to embodiments of the disclosed invention, a lightweight, flexible, soft armor composite design is achieved combining Kevlar®, carbon fiber (CF), and non-Newtonian fluid. The tested NNF compositions, their associated Kevlar® and carbon fiber layering scheme, and the ammunition successfully stopped at 5 m (16.4') range are described in Table 2 below:

TABLE 2

| Prototype | Fabric # sheets (second woven fiber layer 24/ first woven fiber layer 18) | Particle Type (NNF sheet 20) | Solution (NNF sheet 20) | Projectile Containment Result (grain) | Projectile Velocity (~) |
|-----------|---|---|---|---|---|
| A1 | Kevlar ® (8)/ Carbon Fiber(6) | Silica particles | PEG 400 | .44 Mag * (240)\| | 1400 fps |
| B1 | Kevlar ®(8)/ Carbon Fiber(6) | Alumina needles | PEG 400 | .40 S&W * (180)\| | 1100 fps |
| C1 | Kevlar ®(10)/ Carbon Fiber(8) | Disperal needles | PEG 400 | 9 mm *(115) | 950 fps |
| D1 | Kevlar ®(8)/ Carbon Fiber(6) | Alumina particles | PEG 400 | .40 S&W * (180)\| | 1100 fps |
| A2 | Kevlar ®(12)/ Carbon Fiber(9) | Silica particles | Silicone Oil | 9mm (115) | 950 fps |
| B2 | Kevlar ®(12)/ Carbon Fiber(9) | Alumina needles | Silicone Oil | 9 mm (115) | 950 fps |
| C2 | Kevlar ®(12)/ Carbon Fiber(9) | Disperal needles | Silicone Oil | 9mm (115) | 950 fps |
| D2 | Kevlar ®(12)/ Carbon Fiber(9) | Alumina particles | Silicone Oil | 9 mm (115) | 950 fps |

In order to create the exemplary composites described above, the particle types and solutions (solvents) were mixed to create the NNF material in a disposable 50 mL centrifuge tube. Ceramic spheres were added to the solution to aid in the even mixing of the suspension. The particles and fluid were placed into the tube and allowed to sit on a shaker plate for 20 minutes, then allowed to settle. Using a metal spatula, the NNF mixture was spread in a thin layer onto each sheet of carbon fiber measuring 35-36 square inches (single sided application) at a rate of 220 mL/m$^2$. The process was repeated for each layer of CF noted in the designs above. The CF sheets w/ the NNF mixture were then stacked to form a single 35-36 square inch" block (6 layers)

of CF+NNF sheets, which was then vacuum-sealed in a clear food processor bag to prevent leakage and settling of the liquid. The sealed bag (w/CF + NNF layers) was then placed into another food saver plastic bag. 8 layers of Kevlar® sheets were placed inside the same bag, directly behind the sealed CF+NNF package. This bag, containing both the sealed CF+NNF package and 8 layers of Kevlar® sheets was then heat sealed (not vacuum sealed) and weighed. The test prototypes each measured ~35-36 square inches (both 5"×7" and 6"×6" samples were tested) and had varying weight ranges. Prototype A1—largest caliber successful containment (.44 mag)—weighed ~215 g. Subsequent testing of these prototype variants resulted in the successful containment of 9 mm, .40 S&W, and .44 magnum projectiles (as noted above) on center mass impact, fired from 5 m (16.4'), w/ <5 degree angle of incident (specific incident angles during testing range from ($\theta$) 0°-1.164°).

According to another embodiment of the disclosed invention, a lightweight, flexible, soft armor composite design was achieved combining Kevlar®, carbon fiber (CF), and an alternate non-Newtonian fluid (NNF). The NNF composition includes ~220 ml silicone oil and ~90 g disperal needles; material mixed in a glass bowl using a kitchen mixer to bring to approximately peanut butter consistency. NNF is then spread into thin layer (using a spatula) over 5×7" carbon fiber sheets (single sided application); the process is repeated ×8 layers CF. CF layers w/ NNF mixture then are stacked and layered to form a single 5×7" block (8 layers) which was then vacuum sealed in a clear food processor bag to prevent leakage of the liquid. The sealed bag (w/ CF + NNF layers) was then placed into another food saver plastic bag. 10 layers of 5×7" Kevlar® sheets were placed inside the same bag, directly behind the sealed CF+NNF package. This bag, containing both the sealed CF+NNF package and 10 layers of Kevlar® sheets was then sealed and weighed. The test prototype measured ~5×7" (35 sqin) and weighed ~660.71 g. Subsequent testing of this prototype resulted in a successful containment of a 9 mm projectile on center mass impact, fired from a Beretta 92FS (M9 equivalent) @ 5 m (16.4'), w/ <5 degree angle of incident. It should be noted that this embodiment of the invention was actually the first successfully tested design that contained a 9 mm projectile fired from 5 m. This test served to support the original design by demonstrating successful containment of a projectile using the NNF, CF, and Kevlar® combinations. This was a larger and denser sample than those noted in table 2. Using the findings from this sample, testing was performed on additional embodiments to achieve confirmation that the principles described in the invention are valid, but the discrete examples should not be construed as in any way limiting the scope of the invention.

It is expected that this lightweight and flexible soft anti-ballistics alternative may be used to protect users and critical items. Such protective applications include but are not limited to: personal body armor (military, police, etc); curtain armor for use in such things as protection of critical aviation components from projectile impact; armored layering over hard exo-skeletons for structures (tents, plane fuselage, etc); vehicle undercarriage protection (gas tank skid plate alternative); window protection during storms; maritime applications such as boat hull strengthening; supplemental lining protective lining, and potentially sports equipment applications to include hockey, football, and lacrosse pads for the helmet, shoulders, torso, and legs.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A composite material for dissipating the kinetic energy of an impacting object, the composite material consisting of:
    a strike face oriented to receive the impacting object and a protected face oriented to be proximate a user or a protected item;
    a first portion consisting of six layers of carbon fiber each coated with a layer of a Non-Newtonian Fluid (NNF), wherein the NNF sheets are dispensed as a mixture of polyethylene glycol 400 and silica particles at about 7% to 30% $SiO_2$ by weight, wherein the dispensed thickness of the NNF is about 220 ml/m$^2$, wherein the first portion is disposed adjacent the strike face, wherein the at least one first woven fabric layer consists of carbon fiber sheets, wherein the first portion is enveloped in a first container, and wherein the first container is air impermeable, wherein an internal volume of the first container is evacuated to be less than atmospheric pressure, wherein the first container and the second portion are enveloped in a second container, and wherein the second container is air impermeable; and
    a second portion consisting of a second woven fabric layer, wherein the second portion is disposed adjacent the protected face, wherein the second woven fabric layer consists of 8 layers of Kevlar® sheets.

2. The composite of claim 1, wherein the first NNF Sheet is disposed on the surface of the first carbon fiber layer, and wherein the first NNF is not impregnated within a thickness of the first carbon fiber layer.

3. The composite of claim 1, wherein the NNF sheets exhibit shear thinning behavior above shear rates of about $15\times10^6$ s$^{-1}$.

4. The composite of claim 1, wherein the NNF sheets exhibit shear thickening behavior at or below shear rates of about $15\times10^6$ s$^{-1}$.

* * * * *